May 26, 1931.   J. PAISSEAU   1,806,863
PROCESS FOR PRODUCTION OF SUBSTANCE HAVING
A NACREOUS AND CHATOYANT ASPECT
Filed Nov. 19, 1926   2 Sheets-Sheet 1
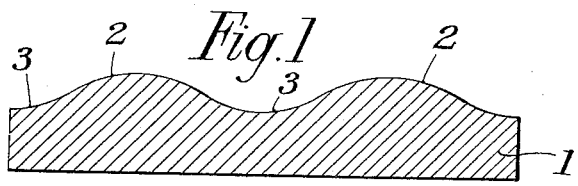
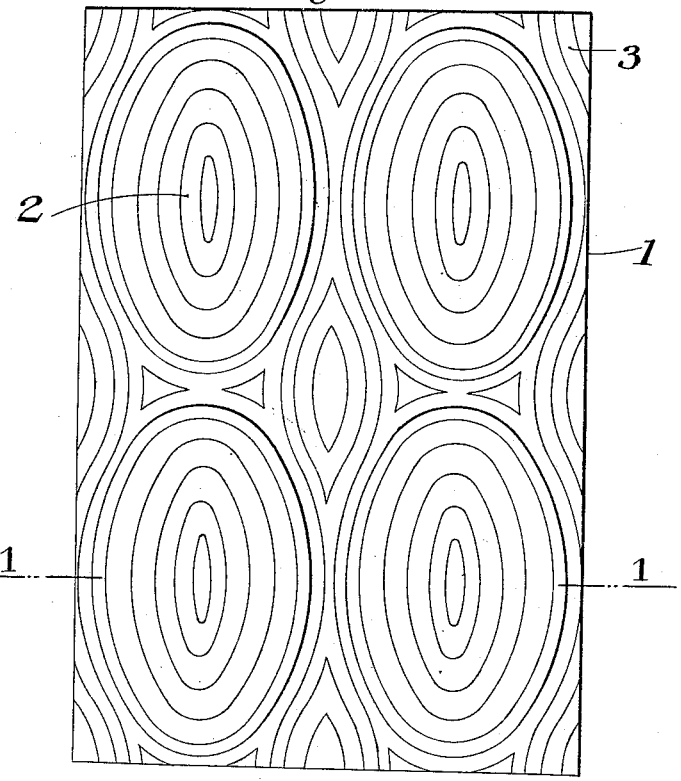
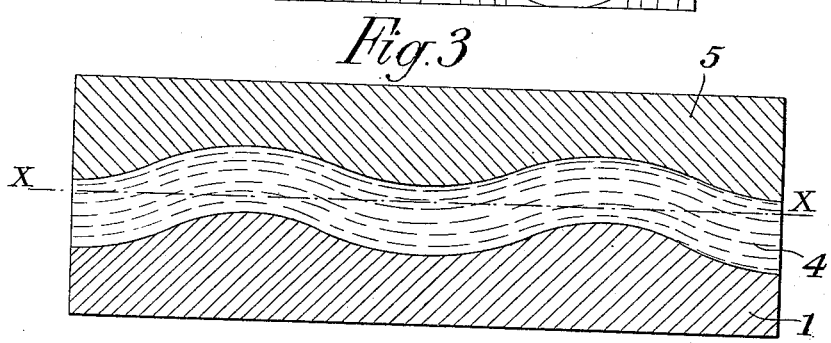
Inventor
Jean Paisseau,
By H. B. Willson & Co.
Attorneys May 26, 1931.  J. PAISSEAU  1,806,863
PROCESS FOR PRODUCTION OF SUBSTANCE HAVING
A NACREOUS AND CHATOYANT, ASPECT
Filed Nov. 19, 1926    2 Sheets-Sheet 2
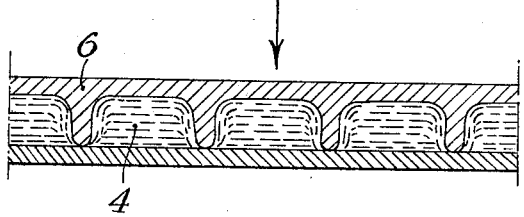
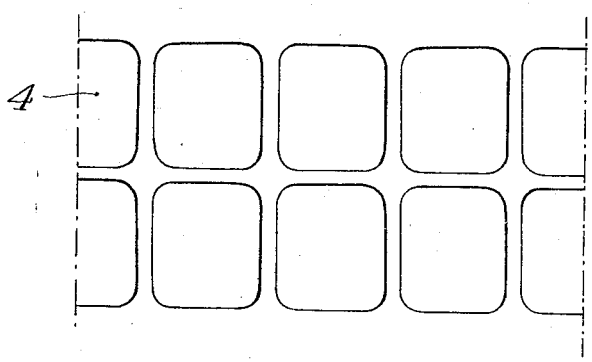
Inventor
Jean Paisseau,
Attorneys Patented May 26, 1931

1,806,863

UNITED STATES PATENT OFFICE

JEAN PAISSEAU, OF PARIS, FRANCE

PROCESS FOR PRODUCTION OF SUBSTANCE HAVING A NACREOUS AND CHATOYANT ASPECT

Application filed November 19, 1926, Serial No. 149,444, and in France November 21, 1925.

The present invention has for an object a process for the treatment of a plastic mass in which are suspended brilliant particles, more particularly particles of a flat shape, such as for example those of pearl essence, for the purpose of giving to this mass a nacreous and chatoyant appearance, the flat faces, or surfaces of the resulting product showing any predetermined design or pattern.

To this end use can be made of a plastic mass for instance a cellulose ester plastic in which the particles have been all orientated parallel to the surface of this mass and parallelly the one to the other, this mass having imparted thereto, by means of pressure members of a determined form, corresponding to the nacreous aspect desired, a slight superficial distortion so as to produce in the required areas or parts a slight disorientation of the brilliant particles.

More specifically the invention has for its object the production in a simple, expeditious and economical manner, of sheets of cellulous ester plastic having the same predetermined design or pattern of a nacreous or chatoyant appearance in all of the sheets, so that a plurality of articles can be produced and all of them will have the same predetermined design or pattern.

The accompanying drawings show, diagrammatically and by way of example, some forms of construction of a device for carrying out practically the present process.

Fig. 1 is a cross section of a tool used for stamping the plastic substance taken on line 1—1 of Figure 2.

Fig. 2 is a plan view of the same tool.

Fig. 3 shows in vertical section the plastic mass during the treatment.

Fig. 4 is a vertical section of a modified form of tool.

Fig. 5 is a partial plan of a plate such as is obtained with the tool of Fig. 4.

If it is desired to produce in series sheets which suggest by their aspect the wavy surface of a slightly agitated water, it will only be necessary to make a die 1, of wood or any other material, showing in relief the aspect which it is desired to obtain on a smooth, flat sheet, that is to say, the die or tool will have projecting parts 2 and hollow or depressed portions 3 (Figs. 1 and 2).

The relief of this die must be a very small one as the brilliant crystalloids of the pearl essence act in the way of mirrors and consequently an angular displacement of $n$ degrees will show to the eye an apparent displacement of $2n$ degrees.

A sheet 4 (Fig. 3) which is orientated flatwise and without any agitated or moving aspect will be laid while still in a soft state upon this die 1 and will be pressed against the same by a punch or die 5 following exactly the reliefs or projections of the said die; after the sheet has been exposed to a somewhat light pressure, so that the substance will not tend to flow over the edges but will distort itself without varying in thickness, what will result therefrom will be an undulated sheet or plate showing exactly the projecting or relief parts and the hollow parts of the die. In this sheet or plate, the particles have remained parallel to the surface and are consequently slightly inclined with reference to an imaginary plane passing through this plate such as the line $x$—$x$ in Fig. 3.

In order to make a block, one will produce the necessary number of sheets or plates which are all alike and can consequently enter all the one into the other. In the bottom of the block press will be placed the die 1 which has been used for goffering or embossing the sheets, then the latter will be stacked the one above the other, care being taken that they fill absolutely all the available space. In other words the sheets will correspond in size to the cross-sectional area of the block-press chamber. Thereabove will be placed the punch or counterdie 5 and the whole will be submitted to the pressure which is required for obtaining their uniting or blocking in the usual manner. When proceeding to the slicing of the block thus obtained, the cutter will attack parts of a varying orientation and plane or flat sheets or plates will be obtained which show by virtue of the reflecting power of the embodied particles, exactly the wavy or fleecy aspect of the die. These sheets will show to some extent the photographic cliché or stereotype of the die.

To the same extent to which the design of the die can be infinitely varied, it will also be possible to vary infinitely the design to be obtained in the article. Even, in order to give them something which has not been provided for, one may place the sheets, no longer exactly the one above the other, bosses against hollow parts indefinitely, but one may reverse the said sheets so as to disorganize the movements during the pressing operation.

In order to be sure of obtaining the particular design desired, it is absolutely necessary, as above specified, for the sheets to fill exactly the empty part or chamber of the block press; if such was not the case, that is to say if empty parts were left between the lateral walls of the press and the sheets which are stacked therein, the substance would flow so as to fill up these empty parts during the pressing operation and there would be formed at certain points streams or currents which would be parallel to these vertical walls and consequently the substance would be more or less disorientated at the edges; the presence of nonchatoyant parts or areas would make it necessary to cut or trim off the sheets, which would consequently produce waste parts.

This process can be simplified due to the fact that the motionless sheet can be given an agitated or moving appearance in compressing the same at some places so as to form therein recesses of any shape: rounded, oval, sinuous and the like. These recesses need not be deep, on the contrary, the slightest distortion or deformation of the surface disturbs, in fact, the order of the particles which never reassume their original position and the result is the production of the required chatoyant aspect after the sheets have been united together into a block and sliced.

One can just as well propose to no longer obtain a sheet with large undulated or wavy motions, reproducing the aspect of the mother of pearl of the pearl oyster, but a fancy chatoyant substance of any design and the practice followed will be just as simple.

For example, if it is desired to obtain a nacreous sheet or plate whose designs recall the crocodile skin, the motionless orientated sheet 4, when still in a soft state, is taken and one sinks or presses therein a punch 6 with thin if not sharp ribs, similar to those which are used for cutting biscuits, but of a suitable design (Fig. 4). Thus, there will be formed in the mass, under the action of the punch or swage 6, disorientation furrows or grooves which will indefinitely subsist and show themselves by the desired design when the block is being sliced (Fig. 5).

Of course the invention is not limited to these two embodiments and the means for carrying out the process may vary indefinitely. Thus it can be devised to cause the orientated and motionless sheet or plate to pass between two opposed cylinders, showing in depth and in relief a design of any kind, or to model the same with the roller or even to warp or undulate the same by any process, for instance in laying the same upon a hot plate, or even in causing the same to bubble by a rapid evaporation of the solvent.

In any case, the new orientation which is given to the particles will subsist even after the elements have been united in the block press. This orientation will simply be reduced in case the dies used for the orientation are not placed in the press.

In the same way, the invention is not limited to the production of sheets or plates having a nacreous aspect or of blocks in which objects are subsequently cut and can also be applied to the manufacture of orientated sticks.

For example, in the cutlery trade, use is made of considerable quantities of ivory or jade-like celluloid, for making handles of a prismatic form or of an oval section. It can be proposed also to use for this purpose an artificial mother of pearl.

However, if the knife handles are cut from a sheet of mother of pearl which is perfectly orientated flatwise, everything will occur as if genuine mother of pearl was cut, i. e. the two faces of the handle corresponding to the faces of the sheet will in fact show the nacreous aspect as searched, but the lateral faces, which are those corresponding to the section, will entirely be deprived from orient, the yellow shade of celluloid will appear therein, which is liable to reduce the value of the finished object.

Having thus described my process and apparatus, what I claim as new therein, and my own invention, is:

Process for the production of sheets of plastic material having a nacreous and chatoyant aspect, the nacreous appearance of which presents a predetermined design, which process consists in utilizing elementary sheets of plastic material in which embedded brilliant particles have all been oriented parallel to the surface, in imparting to the brilliant particles of the said sheets a varied orientation by the action of a die applied upon the sheets when they are in a substantially soft condition, the projecting portions of the die corresponding to the design to be obtained and entering the thickness of the sheet, in cutting the sheets thus treated or distorted to make them correspond in size to the cross-sectional area of the chamber of a block-press, in stacking up the pieces or sheets thus cut upon each other in the said press, in uniting them into a compact block in the said press according to standard practice, and in cutting or slicing the block into sheets of the desired thickness.

In testimony whereof I have hereunto affixed my signature.

JEAN PAISSEAU.